UNITED STATES PATENT OFFICE.

RICHARD KÜCH, OF HANAU, GERMANY, ASSIGNOR TO THE FIRM OF W. C. HERAEUS, OF HANAU, GERMANY.

METHOD OF PROTECTING QUARTZ-GLASS VESSELS.

No. 805,304.  Specification of Letters Patent.  Patented Nov. 21, 1905.

Application filed July 24, 1905. Serial No. 271,100.

*To all whom it may concern:*

Be it known that I, RICHARD KÜCH, a subject of the German Emperor, and a resident of Hanau-on-the-Main, Germany, have invented certain new and useful Improvements in Methods of Protecting Quartz-Glass Vessels, of which the following is a specification.

Quartz-glass is most useful for many purposes, as it is not only transparent, like ordinary glass, but also stable at high temperatures. It is therefore possible to fill transparent vessels wholly or partly with metals which are solid at the ordinary temperature and only become liquid at higher temperatures, and thus to produce new and useful articles. A few examples may be cited for which the said possibility would be desirable and advantageous—viz., thermometers for higher temperatures and gas or vapor electric lamps in which the mercury could be replaced by other metals. There is, however, a great drawback of such metals in that they are very apt to break the quartz-glass vessels on becoming torpid or liquid—for instance, after the use or during the use of the vessels, respectively.

My invention relates to a method of protecting the quartz-glass vessels from breaking under the action of the metal becoming torpid or liquid. This method consists in coating the inside of the quartz-glass vessels as far as it is in contact with the metal with a material which is somewhat elastic and acts, so to say, as a buffer-spring. Pure carbon has been found to answer this purpose very well. The carbon coating can be easily produced in the following manner: Before filling the quartz-glass vessel with the metal a current of a gaseous hydrocarbon—for instance, ordinary illuminating-gas—is passed through the vessel, and at the same time the walls of the vessel on those places in which the carbon coating is to be produced are heated from without up to a temperature at which the quartz-glass softens. The process may be continued until the coating of carbon has attained the desired thickness. Experience has shown that in quartz-glass vessels provided with such internal coatings the metal will not break the vessel either on becoming torpid or on becoming liquid.

What I claim as my invention, and desire to secure by Letters Patent, is—

1. The method of protecting quartz-glass vessels wholly or partly filled with metals, which are solid at the ordinary temperature, from breaking on the metals becoming torpid or liquid, consisting in coating the inside of the vessel in contact with the metal with carbon.

2. The method of producing a coating of carbon on the inside of a quartz-glass vessel, which consists in passing a current of a gaseous hydrocarbon (for instance ordinary illuminating-gas) through the vessel and in heating the respective walls of the vessel from without until the quartz-glass softens.

In testimony whereof I have signed my name to this specification in the presence of two subscribing witnesses.

RICHARD KÜCH.

Witnesses:
 WILHELM BECKER,
 FRIEDRICH EKLERS.